United States Patent [19]

Ogura et al.

[11] Patent Number: 5,548,639
[45] Date of Patent: Aug. 20, 1996

[54] DISTRIBUTED CONTROL OF TELECOMMUNICATION NETWORK FOR SETTING UP AN ALTERNATIVE COMMUNICATION PATH

[75] Inventors: Takao Ogura; Shigeo Amemiya; Koji Tezuka; Takafumi Chujo, all of Kawasaki, Japan

[73] Assignee: Fujitsu Limited, Kanagawa, Japan

[21] Appl. No.: 965,939

[22] Filed: Oct. 22, 1992

[30] Foreign Application Priority Data

Oct. 22, 1991 [JP] Japan .................................. 3-302274

[51] Int. Cl.⁶ ..................................................... H04M 7/00
[52] U.S. Cl. .......................... 379/221; 379/220; 379/229; 370/16
[58] Field of Search ..................................... 379/221, 220, 379/229, 219, 207, 201, 279; 370/16

[56] References Cited

U.S. PATENT DOCUMENTS

| | | | |
|---|---|---|---|
| 4,748,658 | 5/1988 | Gopal et al. | 379/221 |
| 4,931,941 | 6/1990 | Krishnan | 379/220 |
| 4,956,835 | 9/1990 | Grover | 370/16 |
| 4,991,204 | 2/1991 | Yamamoto et al. | 379/221 |
| 5,058,105 | 10/1991 | Mansour et al. | 379/221 |
| 5,142,570 | 8/1992 | Chaudhary et al. | 379/221 |

FOREIGN PATENT DOCUMENTS 0436201  7/1991  European Pat. Off. ........ H04L 12/54

OTHER PUBLICATIONS

H. Komine et al., "A Distributed Restoration Algorithm for Multiple-Link and Node Failures of Transport Networks", Globecom 90, vol. 1, Dec. 1990, pp. 459–463.

K. Sato, et al., "Network Reliability Enhancement With Virtual Path Strategy", Globecom 90, vol. 1, Dec. 1990, pp. 464–469.

K. Sato, et al., "Broad-Band ATM Network Architecture Based on Virtula Paths", IEEE Trans. on Communications, vol. 38, No. 8, Aug. 1990, pp. 1212–1222.

*Primary Examiner*—Jeffery Hofsass
*Assistant Examiner*—Scott Wolinsky

[57] ABSTRACT

A method for restoring a communication failure in a network comprises the steps of providing a predetermined order for selection of the links included in the network, searching for an alternative communication path upon a failure in communication occurring in the network, producing, at a first arbitrary node included in the alternative communication path, a first path setup message containing at least information about the number of the paths to be selected in a first link extending from the first node for setting up the alternative communication path, and an identification code of the path that is to be selected at first in the first link for establishing the alternative communication path, transmitting the first path setup message to a second node also included in the alternative communication path and connected to the first node by a second link, for affecting a setup of the connection therein. The second node selects paths with the number specified by the path setup message according to said predetermined order of selection and affects a connection to the paths in the first link according to the order of selection.

8 Claims, 11 Drawing Sheets

| FIELD 1 | FIELD 2 | FIELD 3 | FIELD 4 | FIELD 5 |
|---|---|---|---|---|
| NODE ID | SOURCE NODE OF MESSAGE | TARGET NODE OF MESSAGE | --- | --- |

| VPI TABLE | PRIORITY | CAPACITY |
|---|---|---|
| 0001→0001 | 3 | 20M |
| 0002→0002 | 2 | 50M |
| 0003→0003 | 1 | 100M |
| 0004→0004 | 2 | 50M |

| VPI TABLE | PRIORITY | CAPACITY |
|---|---|---|
| 0003→1001 | 1 | 100M |
| 0002→1002 | 2 | 50M |
| 0004→1003 | 2 | 50M |

FIG. 7(B) N2

| VPI TABLE | PRIORITY | CAPACITY |
|---|---|---|
| 0001→0001 | 3 | 20M |
| 0002→0002 | 2 | 50M |
| 0003→0003 | 1 | 100M |
| 0004→0004 | 2 | 50M |

| VPI TABLE | PRIORITY | CAPACITY |
|---|---|---|
| 2002→0002 | 2 | 50M |
| 2001→0003 | 1 | 100M |
| 2003→0004 | 2 | 50M |

N8′(BEFORE MODIFICATION)

| SW TABLE | | | |
|---|---|---|---|
| IN | | OUT | |
| TIME SLOT | LINK | TIME SLOT | LINK |
| 3 | L0′ | 7 | L1′ |
| 4 | L0′ | 8 | L1′ |
| 5 | L0′ | 9 | L1′ |
| 6 | LX | 10 | L1′ |
| 7 | LX | 11 | L1′ |

FIG.11(B)

N8′(AFTER MODIFICATION)

| SW TABLE | | | |
|---|---|---|---|
| IN | | OUT | |
| TIME SLOT | LINK | TIME SLOT | LINK |
| 2 | L2′ | 7 | L1′ |
| 3 | L2′ | 8 | L1′ |
| 4 | L2′ | 9 | L1′ |
| 6 | LX | 10 | L1′ |
| 7 | LX | 11 | L1′ |

} MODIFIED

| SW TABLE | | | |
|---|---|---|---|
| IN | | OUT | |
| TIME SLOT | LINK | TIME SLOT | LINK |
| 10 | L3X | 3 | L2′ |
| 11 | L3X | 4 | L2′ |
| 12 | L3X | 5 | L2′ |

FIG.11(D)        FIG.11(E)

| $\frac{2}{3}$ | 2 | 1 | 3 |     | 2 | 2 | $\frac{10}{11}$ | $\frac{4}{4}$ | ⎫ |
|---|---|---|---|---|---|---|---|---|---|
| 4 | 2 | 2 | 3 | → | 3 | 2 | $\frac{12}{4}$ | $\frac{4}{3}$ | ⎬ MODFIED |
| 5 | 2 | 3 | 3 |     | 4 | 2 |  |  | ⎭ |
| 6 | 2 | 4 | 3 |     | 5 | 2 | 5 | 3 |  |
|   |   | 5 |   |     | 6 |   |   |   |  |

DISTRIBUTED CONTROL OF TELECOMMUNICATION NETWORK FOR SETTING UP AN ALTERNATIVE COMMUNICATION PATH

BACKGROUND OF THE INVENTION

The present invention generally relates to telecommunication systems, and more particularly to a telecommunication network that provides distributed control for restoring a communication failure in the network automatically.

In a telecommunication network that includes a plurality of nodes connected with each other by links, a communication path is established through a number of nodes, and information is passed between the nodes as well as through links that connect the nodes with each other. When a failure occurs in one or more of the nodes or links that form a communication path, an alternative communication path has to be searched for in order to maintain the connection. It should be noted that such en alternative path has to hive a sufficient transmission capacity for maintaining the information traffic.

Conventionally, two different control processes are known for performing the alternative path search, one being known as a centralized process and the other being known as a distributed process. The centralized process uses a central station provided commonly to the nodes that are included in the network. In the centralized process, the central station conducts a search for an alternative path that avoids a defective node or link upon detection of a failure in one of the nodes or links forming a communication path. In such a centralized process, the central station is required to conduct an extensive and complex searching operation of the alternative path for numerous combinations of the nodes, and the time necessary for restoring communication inevitably becomes long. Needless to say, one has to provide an extensive processing facility at the central station.

The distributed process, on the other hand, activates a so-called flooding process at first at the node that is included in the existing communication path and located adjacent to the defective node or link. There, the node activates a broadcast with a message indicative of the search for an alternative path originating from a first end node and extending to a second end node, together with information that designates the node that has issued the message as being the second end node of the alternative path. There, the message is transmitted to all the nodes that are linked to the second end node, and each node that has received the broadcasted message in turn activates a re-broadcasting with a message with the information for designating the node that has caused the rebroadcast stamped on the message. When the first end node receives the broadcast after one or more re-broadcastings, the first end node can identify the path that the message has been transmitted on by examining the information about the nodes that are included in the message. Thus, by sending the information along the path thus identified in the direction opposite to the direction of the broadcast, one can maintain the connection while avoiding the defective node.

Figure 1:
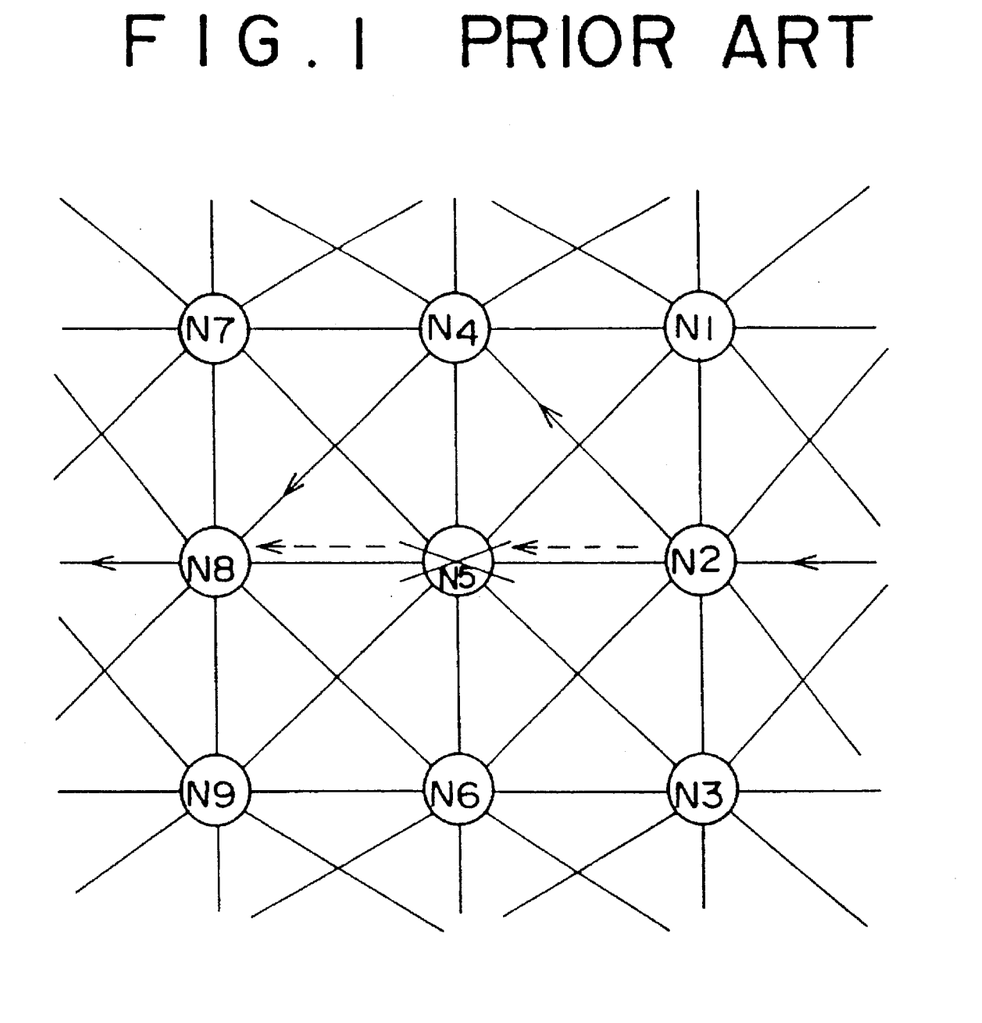
FIG. 1 is a diagram showing a part of the conventional telecommunication network.

FIG. 1 shows the foregoing distributed control process conducted in a network to search for the alternative path.

Referring to FIG. 1 showing a part of the network, the network includes a number of nodes N1–N9 wherein a communication path passing through the nodes N2, N5 and N8 is first established for carrying information traffic that flows from the node N2 to the node N8 via the node N5 or vice versa. When the node N5 becomes defective, for example, this fact is detected immediately at the node N2 or N8 that is located adjacent to the defective node N5, and one of the nodes, such as the node N8, activates a broadcast to all the nodes that are linked thereto. There, the node N8 transmits a path-search message in search of the alternative path, wherein the node N8 is identified in the message as an end node of the alternative path and the node N2 is identified as another end node of the alternative path. In response to the broadcast from the node N8, each of the nodes adjacent to the node N8, such as the nodes N4, N6, N7, N9, . . . , re-broadcasts the path-search message with the information identifying the node, such as the node N4, that causes the re-broadcasting being stamped on the path-search message. By repeating the foregoing broadcasting process, the path-search message ultimately reaches the end node N2 with the information of the nodes, such as the node N4, through which the path-search message has been relayed. Based upon the path-search message thus received, the node N2 transmits a message for setting up an alternative path that avoids the defective node N5 to the relaying node N4 for affecting a switching of communication path therein, and the node N4 in turn transmits a message for effecting a switching of the communication path to the node N8. Thereby, an alternative communication path is setup between the node N2 and the node N8.

When restoring communication according to the alternative path thus searched, it is necessary to rewrite the interconnection switching table, called VPI (virtual path identifier) table, that is provided in each node for specifying the cross-connection between incoming transmission paths and outgoing transmission paths so that the information transmitted from an end node of the alternative path reaches the other end node. According to the CCITT protocol, there are in all 4096 virtual path identifiers in each link, and the VPI table therefore contains a matrix for cross-connecting 4096 virtual path identifiers as represented in TABLE I, wherein TABLE I shows the VPI table for a node, such as the node N8, that switches the incoming virtual paths 0001, 0002, 0003, 0004 . . . to outgoing virtual paths 0001, 0002, 0003, 0004, . . . respectively, where the numerals such as 0001, 0002, 0003, 0004 . . . represent the virtual path identifier.

TABLE I

| IN | OUT |
| --- | --- |
| 0001 | 0001 |
| 0002 | 0002 |
| 0003 | 0003 |
| 0004 | 0004 |
| . . . | . . . |
| 4906 | 4906 |

It should be noted that each node has its own VPI table that differs from other nodes for establishing a predetermined communication path. Thus, it will be understood that the VPI table has to be modified when restoring communication and that the information for modifying the VPI table has to be transmitted to each of the nodes that are included the alternative path. As the VPI table includes 4096 items, the transmission of the whole VPI table to of the nodes included in the alternative path requires transmission of a very large amount of information. The transmission of such a large amount of information through low-speed control channel of the network requires a considerable amount of time, and the time needed for establishing the alternate path becomes inevitably long.

SUMMARY OF THE INVENTION

Accordingly, it is a general object of the present invention to provide a novel end useful control process of a telecommunication network, wherein the foregoing problems are eliminated.

Another and more specific object of the present invention is to provide a control process of a telecommunication network for restoring a communication failure in the network by searching for an alternative communication path, wherein the amount of information necessary for modifying the VPI table at nodes included in the searched alternative path is substantially reduced.

Another object of the present invention is to provide a method for restoring a communication failure in a network, which includes a plurality of nodes connected with each other by links, each link including a plurality of paths, said method comprising the steps of providing a predetermined order of selection for each path in a link: searching for an alternative communication path extending from a first end node to a second end node via an intermediate node by activating a path search process; determining a transmission capacity necessary for said alternative communication path; affecting a connection, at said first end node, after said step of searching for said alternative communication path has been completed, between the paths included in a first link extending from said first end node and forming a part of an original communication path, and the paths included in a second link extending from said first end node and forming a pert of said alternative communication path, said paths in said second link being determined based upon said transmission capacity of said alternative communication path; transmitting from said first end node a path setup message that contains information about the transmission capacity that is required for the alternative communication path, the number of the paths included in said second link and used for said alternative communication path, and an identification of a reference path that is included in said second link and used for said alternative communication path, said path setup message being transmitted along said second link, said reference path being the first path in said second link that is selected for said alternative communication path; identifying, in an intermediate node which is included in said alternative communication path and to which a path setup message is supplied via a third link that forms a part of said alternative communication path, the paths included in said third link and to be switched et said intermediate node for setting up said alternative communication path, based upon said path setup message supplied thereto, said path setup message containing information about the transmission capacity that is required for the alternative communication path, the number of the paths included in said third link and to be used at said intermediate node for establishing said alternative communication path, and an identification of a reference path that is first selected in said third link for establishing said alternative communication path; effecting a switching at said intermediate node for connecting those paths that are included in said third link and identified based upon said path setup message, to paths that are included in a fourth link that extends from said intermediate node and forms a part of said alternative communication path, said intermediate node further transmitting a modified path setup message via said fourth link so that said modified path setup message contains a reference path that is first selected for establishing said alternative communication path, in addition to the information indicating the transmission capacity required for said alternative communication path and the number of the paths used for the alternative communication path; identifying, in said second end node to which a path setup message is supplied via a fifth link that forms a path of said alternative communication path, the paths included in said fifth link and to be switched at said second end node for setting up said alternative communication path, based upon a path setup message supplied thereto, said path setup message containing information about the transmission capacity that is required for the alternative communication path, the number of the paths included in said fifth link and to be used at said intermediate node for establishing said alternative communication path, and an identification of a reference virtual path that is included in said paths in said fourth link and is first selected for establishing said alternative communication path; and affecting a switching at said second end node to connect those paths that are included in said fifth link and identified based upon said path setup message, to paths that are included in a sixth link that extends from said intermediate node and forms a part of an original communication path. According to the present invention, it is possible to minimize the information that is transmitted along the alternative communication path to effect the modification of the VPI table in each node included therein. Thereby, a quick switching for the alternative communication path can be achieved.

Other objects and further features of the present invention will become apparent from the following detailed description when read in conjunction with the attached drawings.

DETAILED DESCRIPTION OF PREFERRED EMBODIMENTS

Before describing the preferred embodiments of the present invention, a brief summary about the setup of a communication path in the telecommunication network and a process for searching for en alternative communication path in such a telecommunication network upon failure occurring in the existing communication path will be given. It should be noted that the process for searching for the alternative communication path mentioned herein is known, for example from the U.S. Pat. No. 4,956,835 to Grover or from European Laid-open Patent Publication EP 0 436,201 by the applicant of the present invention. The disclosure of U.S. Pat. No. 4,956,835 is incorporated herein by reference.

Figure 2:
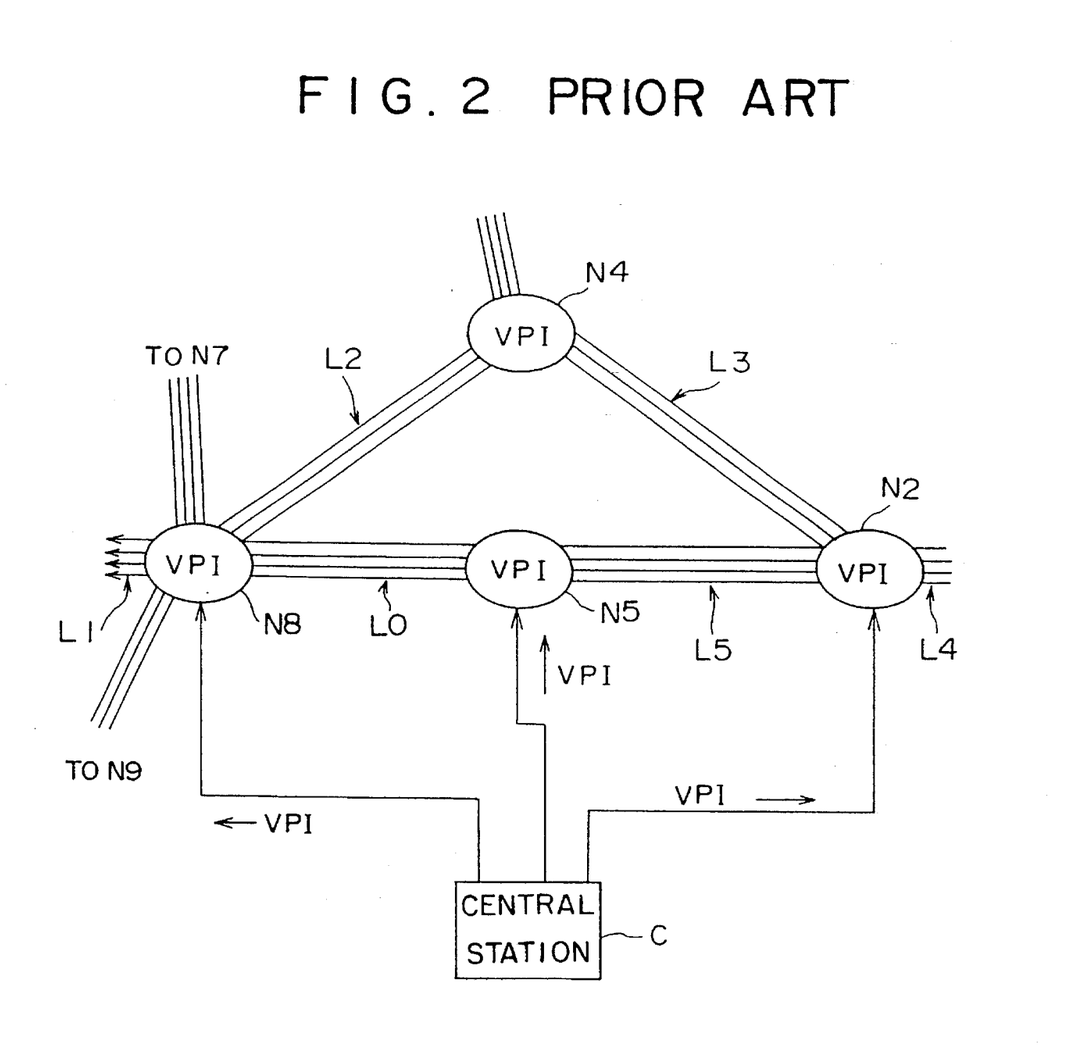
FIG. 2 is a diagram showing the setup of a communication path in the telecommunication network shown in FIG. 1.

FIG. 2 shows a part of the network already explained with reference to FIG. 1.

Referring to FIG.2 showing the setup of a communication path in the network, a central station C supplies control signals to respective nodes that are included in the communication path to be established over a control channel, and each node is provided with a VPI table explained previously with reference to TABLE I. Thereby, incoming-side virtual paths and outgoing side virtual paths are cross-connected with each other based upon the VPI table thus set in each nods. In the illustrated example, the node N8 is connected to the node N5 by a link L0 and to the node N4 by a link L2, the node N4 being connected to the node N2 by a link L3 and to the node N5 by a link L5. The node N2 has another link L4. The node N8 also has another link L1, and the communication path may, for example be setup successively through the links L1, L0, L5 and L4 and vice versa.

Figure 3:
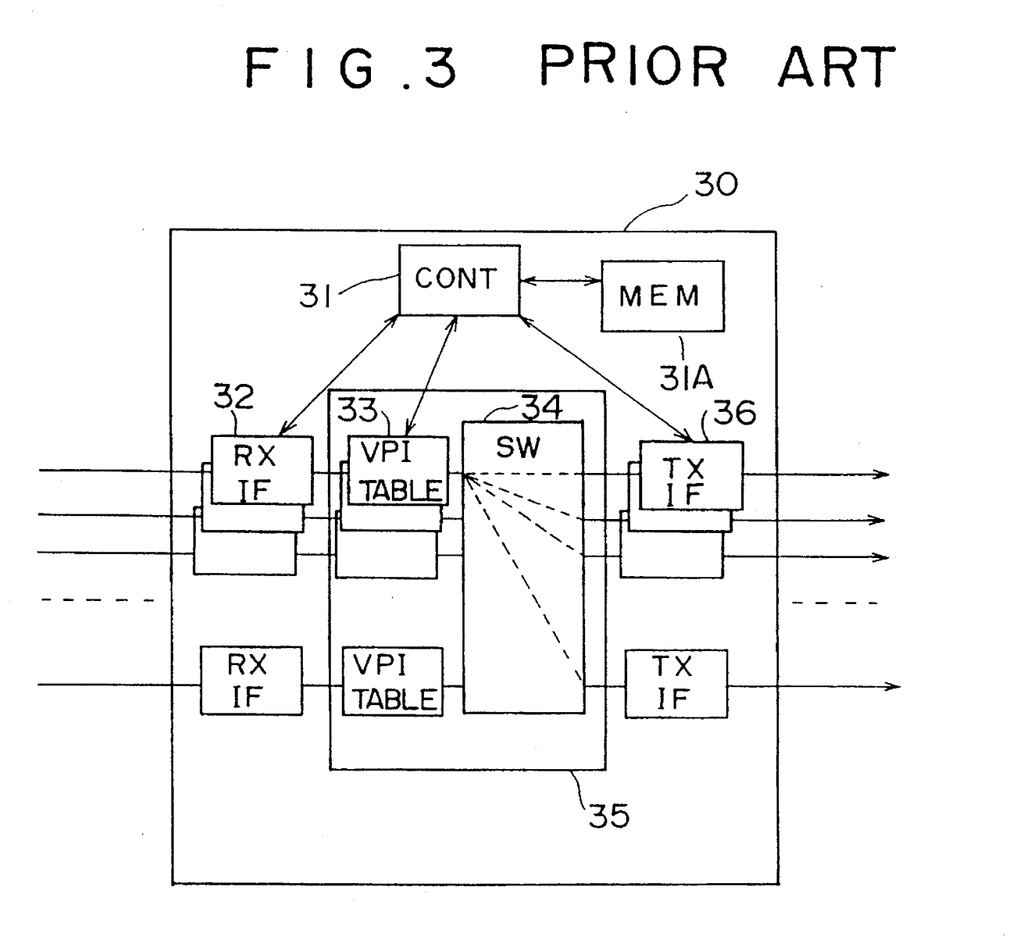
FIG. 3 is a diagram showing the construction of a node used in the telecommunication network of FIG. 2.

FIG. 3 shows the hardware construction of the node included in the network of FIG.2.

Referring to FIG. 3, a node designated at 30 includes a number of incoming-side interface units 32 connected electrically to the incoming trunks and a number of outgoing-side interface units 36 connected electrically to the outgoing trunks, wherein the incoming-side interface units 32 produce input signals on 4096 virtual paths while the outgoing-side interface units 36 produce output signals to be transmitted along the outgoing trunks based upon input signals supplied thereto from 4096 virtual paths. Further, there is provided a switching unit 34 that switches the connection between the 4096 virtual paths from the incoming-side interface units 32 and the 4096 virtual paths to the outgoing-side interface units 36 based upon the VPI table that is provided in a VPI unit 33. Further, the interface units 32 and 36 as well as the VPI unit 33 are controlled by a controller 31 that refers to a database stored in a memory unit 31A for the control. Thereby, the VPI unit 33 and the switching unit 34 form a cross-connection unit 35 that achieves the foregoing cross connection of the virtual paths.

Next, the searching process for searching for an alternative path upon a failure in the network will be described with reference to FIGS. 4 and 5.

Figure 4:
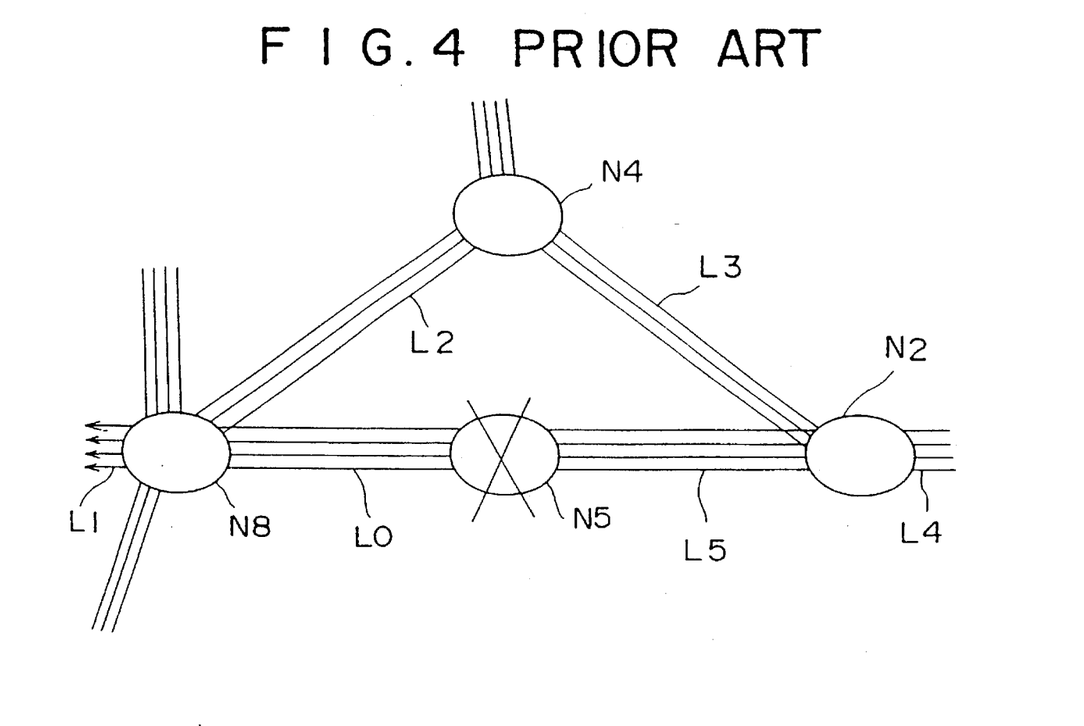
FIG. 4 is a diagram showing a searching process for an alternative communication path upon a failure occurring in one of the nodes.

Referring to FIG. 4 showing the occurrence of failure in the node N5 that is included in the communication path which extends from the node N2 to the node N8 and transmits a flow of information through the node N5 via the links L4, L5, L0 and L1, the failure of the node N5 is detected for example by a supervisory function of the central station C. Alternatively, the failure may be detected either at the node N2 or at the node N8 upon the detection of a loss of incoming signals or an error in the information received. In any event, the nodes N2 and N8 are informed of the failure and one of the nodes N2 and N8, such as the node N8, transmits to all the nodes that are connected thereto a message indicating that a search for an alternative communication path is being conducted.

Figure 5:
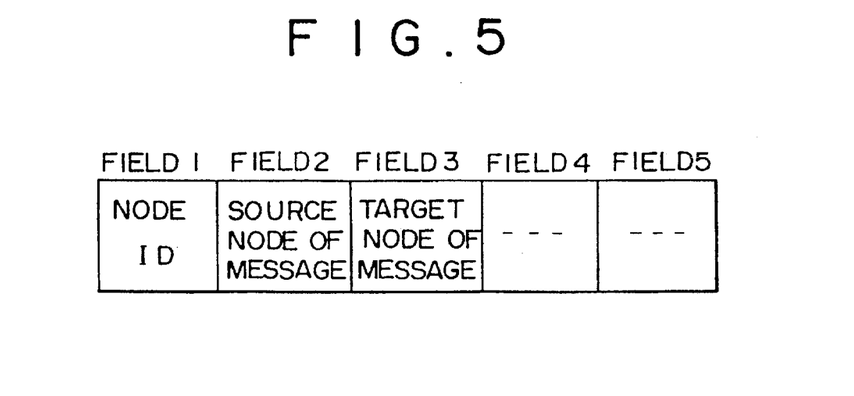
FIG. 5 is a diagram showing an example of the path restoration message used in the process of FIG. 4 for restoring communication.

FIG. 5 shows an example of a format of the path-search message that is transmitted from the node N8 during the searching process for searching for the alternative path.

Referring to FIG. 5, the path-search message includes five fields, wherein the first field designated as "field 1" stores the node identification number or code of the node that transmits the path-search message. On the other hand, the second field designated as "field 2" stores the node identification code of the source node that has dispatched the path-search message, while the third field designated as "field 3" stores the node identification code of the target node located on the communication path and to which node the path-search message is directed for establishing an alternative path. In other words, the alternative path is established between the target node and the source node. In the example of FIG. 4, the node N8 acts as the source node and the node N2 acts as the target node. The fourth and fifth fields are used for other purposes. Thus, the message dispatched from the node N8 upon the detection of the failure at the node N5 includes the node identification of the node N8 at the first and second fields and the node identification of the node N2 at the third field.

The path-search message is broadcasted from the node N8 to 811 the nodes that are located adjacent to the node N8 via unused paths, and the node that receives the path-search message stores the same in the memory device such as the memory 31A provided therein. Further, the node checks whether the node identification set in the fields 2 and 3 corresponds to the node identification of the node itself. If NO, the node stamps its own node identification in the field 1 and re-broadcasts the path-search message. For example, the node N4 re-broadcasts the path-search message that the node N4 has received. Thus, after one or more re-broadcastings, the path-search message ultimately reaches the node N2, wherein the node N2 recognizes the node identification in the field 3 that designates the same node as the node N2. The node N2 then dispatches an acknowledgement message that the alternative communication path has been discovered to the node N4, based upon the node identification stamped in the field 1 of the path search message, and the acknowledgement message is relayed back to the node N8 that has issued the path search message by referring to the stamp of the node identification in the field 1. It should be noted that each node that has relayed the path search message stores the path search message that the node has received at the memory device 31A.

In response to the detection, at the node N8, of the acknowledgement message returned from the node N2, the node N8 activates the setting up of the alternative communication path. Hereinafter, the setting up of the alternative communication path that forms the essential part of the present invention will be described, with reference to FIG. 6.

Figure 6:
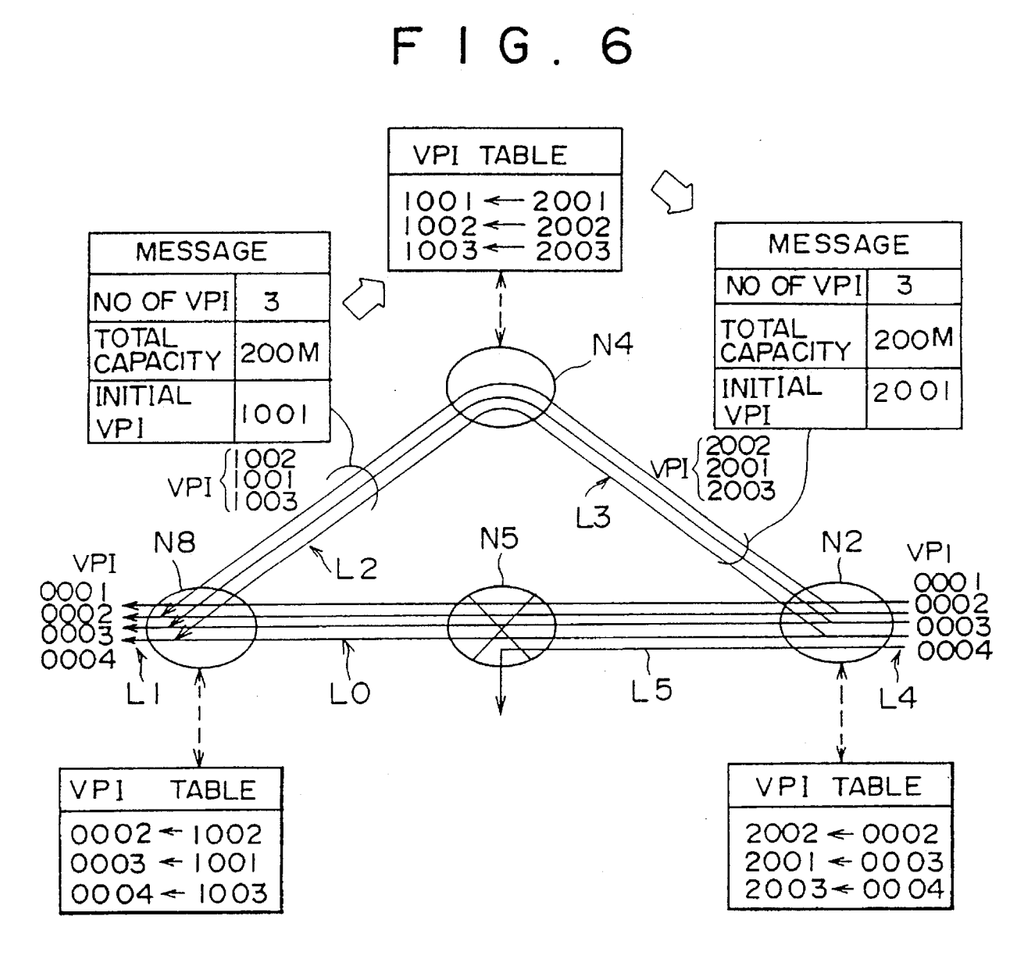
FIG. 6 is a diagram showing the setup of the alternative path in the telecommunication network of FIG. 2 according to a first embodiment of the present invention.

Referring to FIG. 6 showing a first embodiment of the present invention, wherein an alternative communication path has been found which passes through an intermediate node N4 via the links L2 and L3, the node N8 at one end of the alternative communication path effecting a modification of the VPI table therein such that virtual paths 0002, 0003 and 0004 that are Included in the link 21 and form a part of the defective original communication path together with the corresponding virtual paths 0002, 0003 and 0004 of the link L0, are connected respectively to virtual paths 1001, 1002 and 1003 that are included in the link which link forms a part of the alternative communication path and connects the node N8 to the node N4. There, the virtual paths 1001, 1002 and 1003 which have not been used for other communication purposes in the link L2 can be freely used for the alternative communication path.

The selection of the virtual paths 1001, 1002 and 1003 is achieved based upon the capacity necessary for sustaining the alternative communication path and further based upon a predetermined rule that is common to each node of the network. In the present embodiment, the unused virtual paths in the second link L2 are selected, starting from a virtual path having the highest priority, until a number of the unused virtual paths Sufficient for sustaining the lost traffic are secured. When the total transmission capacity of the unused virtual paths 1001–1003 in the link L2 is insufficient for sustaining the lost communication traffic, a second alternative communication path will be searched for after the alternative communication path under consideration has been setup successfully.

It should be noted that the virtual paths in a link forming the network Of the present invention are allocated a predetermined priority and predetermined transmission capacity. For example, the virtual path 1001 has the highest order of priority among the virtual paths 1001–1003 and has a transmission capacity of 100 Mbit/sec. Similarly, the virtual path 1002 has the second order of priority and has a transmission capacity of 50 Mbit/sec. Further, the virtual path 1003 in the second link also has the second highest priority and has a transmission capacity also of 50 Mbit/sec.

Thus, when the total capacity of the lost traffic detected at the node N8 is 200 Mbits/sec, which corresponds to the loss of the virtual paths 0002, 0003 and 0004 at the node N5, the virtual paths 1001, 1002 and 1003 are sufficient for sustaining the alternative communication path. The modification of the VPI table at the node N8 for effecting the switching of the connection at the node N8 will be described below with reference to FIG. 7(A).

In order to establish a connection for the alternative communication path all the way from the node N8 to the node N2, it is necessary to transmit information about the virtual paths 1001–1003 thus selected at the node N8 to the intermediate node N4 at the other side of the link 62 to effect a switching therein such that the virtual paths 1001–1003 be connected to the virtual paths in the link L3 that connects the node N4 and the node N2.

For this purpose, the node N8 transmits a path setup message that is formed of three fields, the first field for storing the number of the virtual paths to be switched, the second field for storing the transmission capacity required for the alternative communication path, and the third field for storing the VPI of the virtual path in the link, which path has the highest order of priority as illustrated in FIG. 6. For example, the path setup message sent from the node N8 to the node N4 includes a numeral three (3) in the first field which is the number of the virtual paths to be selected in the link for establishing the alternate communication path, the transmission capacity of 200 Mbits/sec in the second field which is the total transmission capacity necessary for sustaining the alternative communication path, and the VPI 1001 in the third field which is the identification of the virtual path included in the link and has the highest priority. As the path setup message contains only three fields, the amount of information transmitted from the node N8 to the node N4 to effect the modification of the VPI table is significantly reduced. This effect becomes particularly significant when a very large number of virtual paths are included in the alternative communication path.

In response to the path setup message thus transmitted from the node N8, the node N4 recovers the virtual path identifiers 1001, 1002 and 1003 based upon the order of priority in the database of the node N4. Further, the node N4 effects a switching of the virtual paths therein by modifying the VPI table such that the virtual paths 1001–1003 in the link L2 are connected to virtual paths 2001–2003 that are included in the link L3. In order to effect the switching, therefore, it is necessary to select the unused virtual paths 2001–2003 in the node N4. When selecting the virtual paths at the node N4, it is of course necessary to secure the transmission capacity for the alternative communication path. Further, the number of the virtual paths should be equal to the number of the virtual paths in the link extending between the nodes N8 and N4 and forming the alternative communication path.

In the present embodiment, the node N4 effects three unused virtual paths 2001, 2002 and 2003 in the link extending between the node N4 and the node N2 according to the order of priority and the required transmission capacity. In the illustrated example, the virtual path 2001 has the highest priority order among the three virtual paths 2001–2003. Further, the node N4 re-transmits the path setup message to the node N2 after modification to replace the virtual path identifier of the highest priority from the former value of 1001 with the updated VPI value of 2001. See FIG. 6. Again, one can reduce the amount of information necessary for transmitting the virtual path identifiers by transmitting the path setup message rather than transmitting the entire VPI table.

At the end node N2, the virtual path identifiers of the selected virtual paths are recovered from the path setup message transmitted from the node N4, and the VIP table at the node N2 is modified such that the virtual paths 2002, 2001 and 2003 are connected respectively to the virtual paths that form the original communication path in the link L4 exiting from the node N2, such as the paths 0002, 0003 and 0004. Thereby, the virtual path 2001 having the highest priority in the link L3 is connected to the virtual path 0003 that has the highest priority in the link L4 forming the original communication path, the virtual path 2002 having the second priority in the link L3 is connected to the virtual path 0002 having the second priority in the link L4, and the virtual path 2003 having the second priority in the link L3 similar to the virtual path 2002 but having a VPI number smaller than the virtual path 2002, is connected to the corresponding virtual path 0004 that also has the second priority in the link L4 and the VPI number smaller than the virtual path 0003.

Figure 7A:
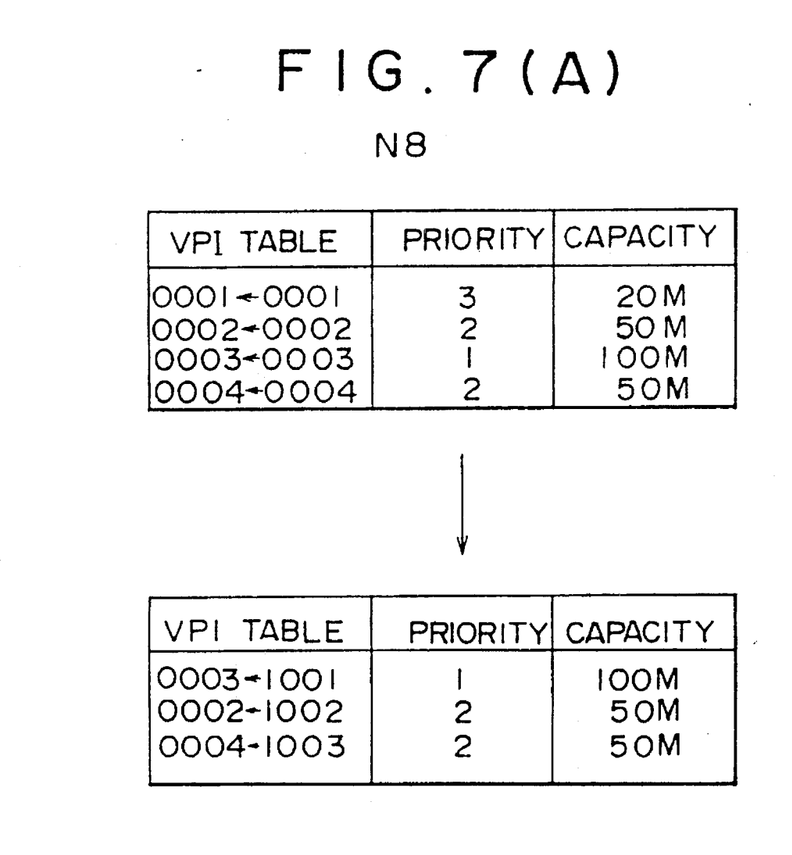
FIGS. 7(A) and 7(B) are diagrams showing the modification of the VPI table in each node for achieving the setup of the alternative communication path.
Figure 7B:
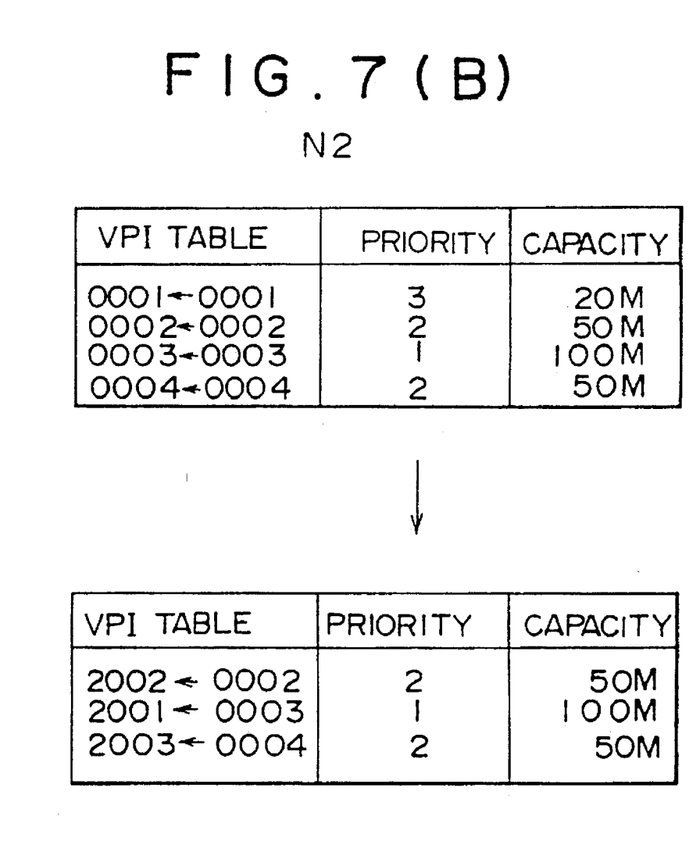

FIGS. 7(A) and 7(B) show the foregoing modification of the VPI table, wherein FIG. 7(A) shows the modification at the node N8 while FIG. 7(B) shows the modification at the node N2.

Referring to FIG. 7(A) showing the VPI table at the node N8, the original VPI table indicating the cross-connection between the virtual paths 0001–0004 in the link L1 and the virtual paths 0001–0004 in the link L2 is modified such that the virtual path 0003 is connected to the virtual path 1001, the virtual path 0002 is connected to the virtual path 1002, and the virtual path 0004 is connected to the virtual path 0003, as already explained. As already noted, the virtual path 1001 has the transmission capacity of 100 Mbits/sec and has the highest priority among the virtual paths 1001–1003, while the virtual paths 1002 and 1003 both have the transmission capacity of 50 Mbits/sec and the second priority order. By selecting the virtual paths 1001–1003 for the alternative communication path, one can secure the transmission capacity of 200 Mbits/sec.

Similarly, the original VPI table at the node N2 is modified as shown in FIG. 7(B), wherein the virtual path 2001 is connected to the virtual path 0003, the virtual path 2002 is connected to the virtual path 0002 and the virtual path 2003 is connected to the virtual path 0004. There, it will be seen in FIG. 7(B) that the virtual path 2001 has the highest order of priority and the transmission capacity of 100 Mbits/sec, while the virtual paths 2002 and 2003 both have the second order of priority and the transmission capacity of 50 Mbits/sec.

Figure 8:
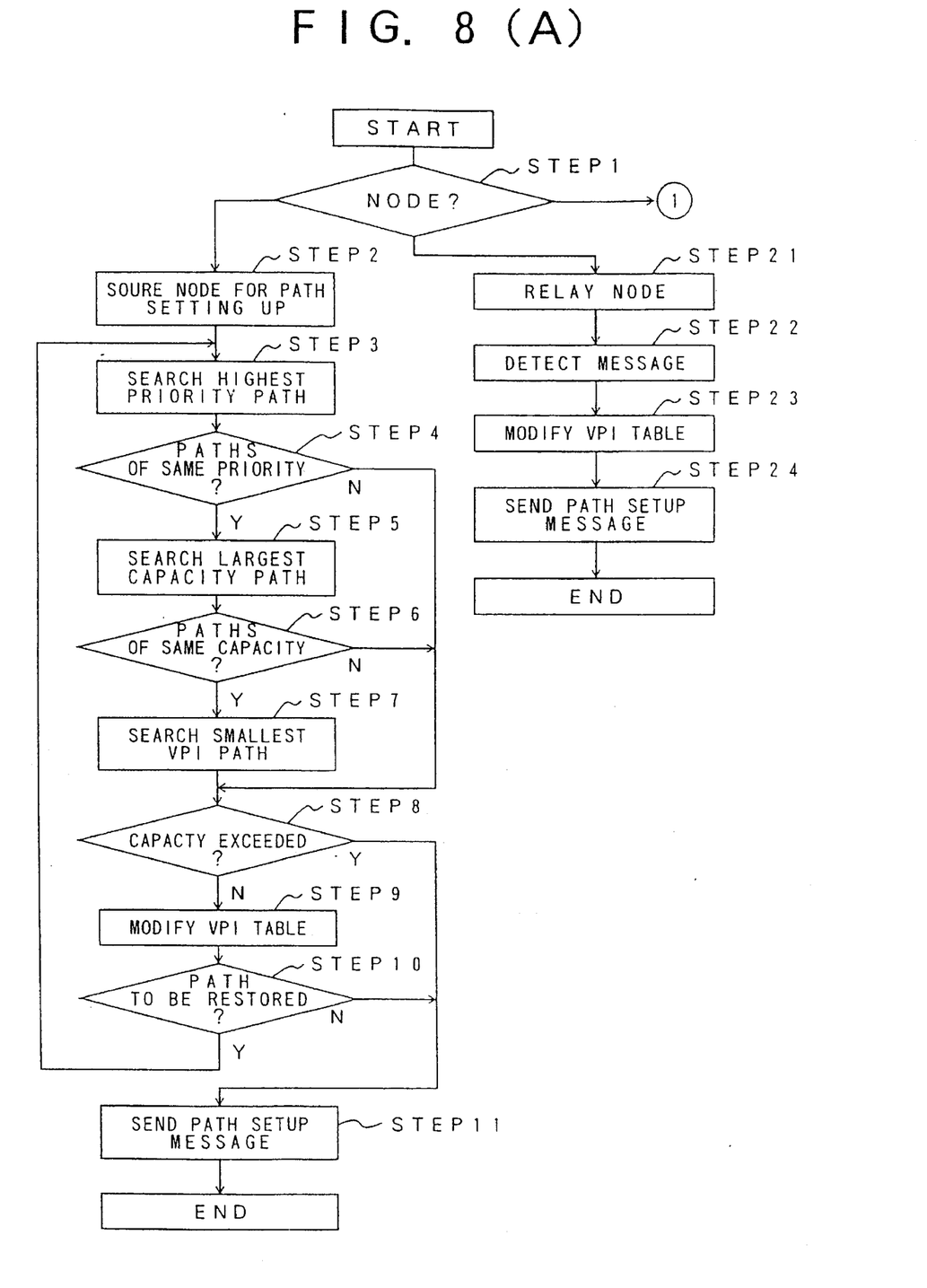
FIGS. 8(A) and 8(B) are flowcharts showing the operation of various nodes for affecting the setup of the alternative communication path.

FIGS. 8(A) and 8(B) show the details of the foregoing path setup process conducted at the nodes N8, N4 and N2.

Referring to FIG. 8(A), a discrimination is made in each node, as indicated in a step 1, whether the node under consideration is the end node such as the node N8 from which the path search message has been dispatched, whether the node under consideration is the intermediate node such as the node N4 that has been discovered as a result of the flooding process, or whether the node under consideration is the node at the other end of the alternative communication path such as the node N2.

When the node under consideration is the node N8 from which the path search message has been dispatched as indicated in a step 2, the virtual paths such as the virtual paths 0002, 0003 and 0004 that are included in the link L1 and forming the original communication path are selected together with the respective orders of priority and transmission capacities.

Next, a step 3 is conducted to search for the unused virtual path having the highest order of priority in the link L2 by referring to a database provided in the node N8. It should be noted that the database is provided in the memory device such as the memory 31A (see FIG. 3) and stores therein the virtual paths, for each link extending from the node N8, together with the respective orders of priority and the transmission capacities. There, those virtual paths, including the already established alternative communication path, that are already in use for other communication purposes are of course excluded. Thereby, the virtual path 1001 may be selected as the virtual path having the highest priority. When the virtual path 1001 is already in use, the virtual paths 1002 and 1003 having the second order of priority are selected.

Next, in a step 4, a discrimination is made whether there are a plurality of selected virtual paths having the same priority in the link L2, and if the result is YES, the virtual path having a largest transmission capacity is selected in a step 5. Further, in a step 6, a discrimination is made whether there are a plurality of selected virtual paths wherein the transmission capacity is the same, and if the result is YES, the virtual path having the smallest VPI value is selected in a step 7.

Next, a discrimination is made in a step 8 whether the transmission capacity of the link formed by the virtual path(s) thus selected is equal to or larger than the required transmission capacity of the alternative communication path or not, and If the result of the step 8 is NO, the selected virtual path such as the virtual path 1001 is used for modifying the VPI table of the node in a step 9 such that the selected virtual path is connected to one of the virtual paths included in the first link, such as the virtual path 0003. When the virtual path 0003 having the hilt heat priority is selected, the virtual path 1001 having the highest priority is connected in the step 9 to the virtual path 0003 thus selected. Similarly, when the virtual path 0002 having the second priority is selected in the step 4, the virtual path 1002 having the second priority is connected to the virtual path 0002 in the step 9. Further, a discrimination is made in a step 10 whether there is a virtual path in the original communication path that is yet to be restored, and is YES, the steps starting from the step 3 are repeated. By repeating the processes between the step 3 and the step 10, the virtual paths 1002 and 1003 are selected consecutively and respectively connected to the virtual paths 0002 and 0004 according to the order of priority and the transmission capacity as a result of the modification of the VPI table in the step 9.

In the foregoing processes, when the result of discrimination is NO in the step 4, the steps 5–7 are skipped. Similarly, when the result of discrimination is NO in the step 6, the step 7 is skipped. Further, when it is discriminated in the step 8 that the transmission capacity of the link L2 thus setup has exceeded the transmission capacity of the alternative communication path, or when it is discriminated in the step 10 that there is no virtual path to be restored, the path setup message described previously is produced and dispatched in a step 11. It should be noted that the foregoing steps 1–11 are conducted under the control of the controller 31 provided in the node.

Next, the operation at the intermediate node such as the node N4 will be described.

Referring to FIG. 8(A) again, a step 21 is conducted, as a result of a discrimination made in the step 1, for identifying the node as being the intermediate node, and a step 22 is conducted to receive the path setup message from the node such as the node N8 that is included in the alternative communication path and linked to the node under consideration by the link L2. Further, the virtual paths such as the virtual paths 1001, 1002 and 1003 are recovered from the path setup message thus transmitted based upon the database in the node N4, and the table at the intermediate node is modified in a step 23 as already described by selecting the virtual paths that are included in the link 53 extending from the node N4 and forming a part of the alternative communication path. There, the virtual paths in the links L2 and L3 are connected according to the order of priority in each link, similarly to the node N8. It should be noted that the order of priority of the virtual paths in the links L2 and 53 is stored in the database provided in the nude N4. Further, the path setup message is modified by setting the VPI of the virtual path having the highest priority in the link L3, such as the virtual path 2001, and the path setup message thus modified is then transmitted, in a step 24, to the node N2 along the link L3.

Further, FIG. 8(B) shows the operation of the end node such as the node N2 located at the other end of the alternative communication path.

Referring to FIG. 8(B), a step 31 is conducted to identify the node N2 at the other end of the alternative communication path, and a step 32 is conducted for receiving the path setup message that is transmitted from the intermediate node N4 along the link L3. There, the virtual paths 2001, 2002 and 2003 are recovered based upon the path setup message according to respective the orders of priority, transmitted capacities end numbers of the virtual paths by referring to the database of the node N2. Further, in a step 33, the virtual paths included in the link L4 that extends from the node N2 and forming a part of the original communication path are searched by referring to the same database of the node N2. In the case of FIG. 6, the step 33 searches for the virtual paths 0002, 0003 and 0004, wherein the virtual path 0003 has the highest order of priority end the virtual paths 0002 and 0004 have the second order of priority, in conformity with the order of priority at the node N8.

Next, in a step 34, a virtual path having the highest priority such as the virtual path 0003 in the link L4 is identified, and a discrimination is made in a step 35 whether there are a plurality of such virtual paths having the same order of priority. If such a plurality of virtual paths exist, a step 36 is conducted to select the virtual paths having the largest transmission capacity from the virtual paths selected in the step 34. Further, when it is discriminated in a step 37 that there are a plurality of virtual paths each having the same transmission capacity, the virtual path having the smallest number is searched for in a step 38, and the virtual path thus selected is used in a step 39 to modify the VPI table, wherein the virtual path thus selected such as the virtual path 0003, is set to correspond to the virtual path 2001 that has the highest priority. Thereby, a path connecting the virtual path 0003 to the virtual path 2001 is established. When the result of the step 35 is NO, the steps 36–38 are skipped and the process at the step 39 is conducted immediately. Similarly, when the result of the step 37 is NO, the process at the step 39 is conducted immediately.

After the step 39, a discrimination is made in a step 40 whether the alternative communication path for carrying the lost traffic is fully restored or not, and if the result is NO, the steps starting from the step 34 are repeated. Thereby, the virtual path 0002 is selected in the step 34 and the virtual path 0002 is connected to the virtual path 2002 in the step 39. Similarly, by repeating the steps 34 et seq. again, the virtual path 0004 is selected and the virtual path 0004 is connected to the virtual path 2003.

In the foregoing description of the first embodiment, it will be noted that the alternative communication path may contain more than one intermediate node N4. As the order of connection is prescribed in each node according to the priority the transmission capacity and the VPI number, the setup of the alternative communication path can be achieved by the minimum transmission of information. Further, the order of the process between the steps 3–7 and 34–38 may be modified such that the path having the largest capacity is selected first, as long as the order of selection of the path is determined commonly for each of the nodes forming the network. Further, the present invention is by no means limited to the actual process of searching the alternative communication path. For example, the process of the present invention is applicable to the path search process of Grover, U.S. Pat. No. 4,956,835 op cit. as well as to the path search process of EP 0 436 201 proposed by the inventors of the present invention.

Figure 9:
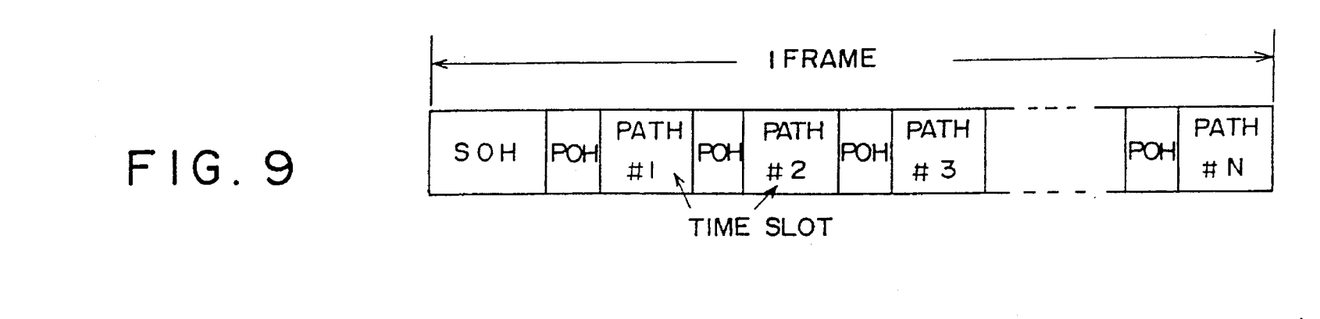
FIG. 9 is a diagram showing the format of information that is transmitted in a network operating in a synchronous transfer mode according to a second embodiment of the present invention.

Next, a second embodiment of the present invention for implementing the setup of the alternative communication path in the case of the synchronous transfer mode known as STM will be described with reference to FIGS. 9 and 10 as well as FIGS. 11(A)–11(C), wherein FIG. 9 shows the format of data that is transmitted In the synchronous transit mode.

Referring to FIG. 9, the data is transmitted as a periodical repetition of frames, wherein each frame includes a succession overhead (SOH) followed by repetition of a path overhead (POH) and a corresponding user payload for carrying information. There, each payload is given a predetermined time slot and carries information corresponding to a path, and the switching between the paths is achieved by exchanging the time slots of the payloads. In other words, each node of the second embodiment has a switching table similar to the VPI table for cross-connecting the time slots of the payloads, and the setup of the alternative communication path is achieved by modifying the switching table at each node of the alternative communication path.

Figure 10:
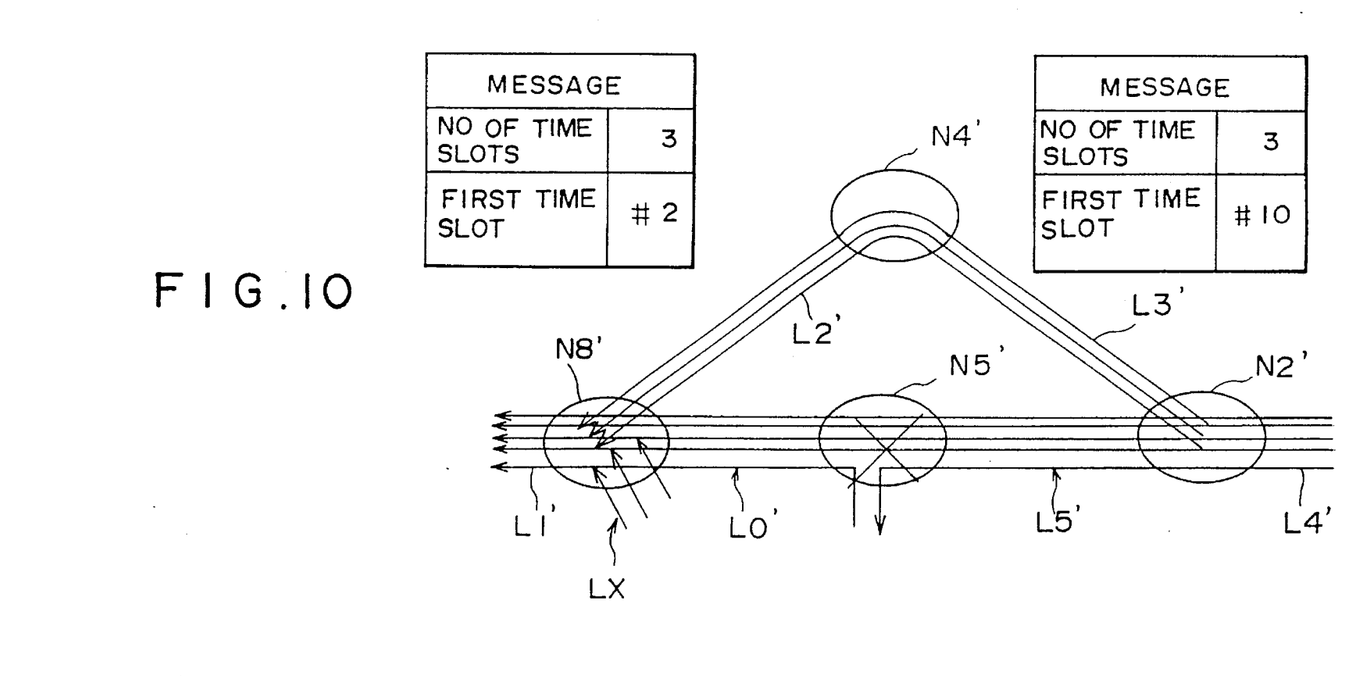
FIG. 10 is a diagram showing the setup of the alternative communication path according to the second embodiment.

Referring to FIG. 10 showing the restoration of communication in a STM network, the network includes nodes N2', N4', N5' and N8' respectively corresponding to the nodes N2, N4, N5, and N8, wherein FIG. 10 shows the situation that an original communication path is set between the nodes N2' and N8' through the node N5' via links L4', L5', L0' and L1' and that the node N5' has become defective. In correspondence to the network of FIG. 6, the network of FIG. 10 further includes links L2' and L3' respectively connecting the node N4' to the node N8' and the node N2' to the node N4'.

Figure 11A:
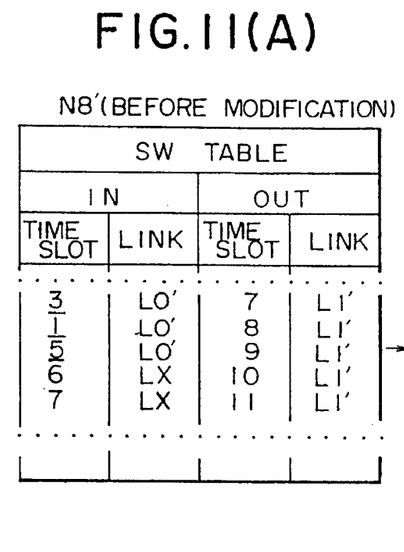
FIGS. 11(A)–11(E) are diagrams showing the switching occurring at various nodes in the network for restoring the communication according to the second embodiment.
Figure 11B:
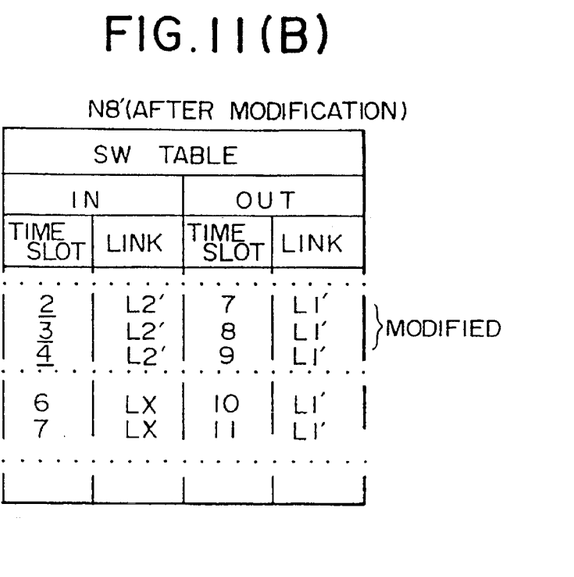
Figure 11C:
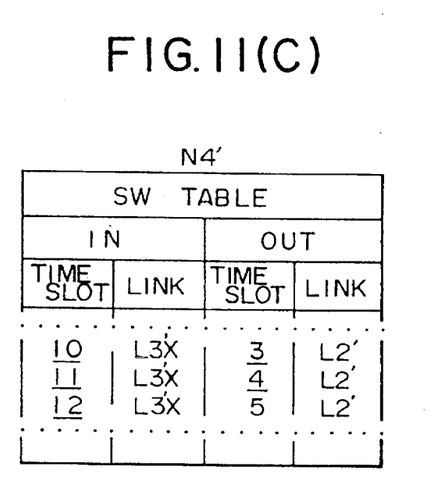

Upon the detection of failure of the node N5', the node N8' identifies the unused time slots in the link L2' extending from the node N8' to the node N4', starting from the time slot having the highest order of priority and effects a modification of the switching table as shown in FIGS. 11(A) and 11(B), wherein FIG.11(A) shows the correspondence of the time slots before the modification of the switching table and FIG. 11(B) shows the correspondence of the time slots after the modification of the switching table.

Referring to FIG. 11(A) showing the switching of the time slots before the table modification, the time slot #3 having the highest priority in the link L0' is "switched" to the time slot #7 that has the highest priority In the link L1'. Similarly, the time slot #4 having the second priority in the link L0' is switched to the time slot #9 in the link L11', and the time slot #5 having the third priority in the link L0' is switched to the time slot #9 in the link L0'. Further, FIG. 11(A) shows switching of another link Lx to the link L1' of which description is omitted.

Upon the detection of the failure of the node N5, the node N8' searches for the unused time slots in the link L2' that forms the alternative communication path. There, the time slots are searched in number corresponding to the time slots that have carried the lost traffic, and the modification of the switching table is conducted as indicated in FIG. 11(B). There, it will be noted that unused time slots #2, #3 and #4 in the link L2' are switched to the time slots #7, #8 and #9 of the link L1' respectively, wherein the time slot #2 in the link L2' has the highest priority, the time slot #3 has the second priority and the time slot #4 has the third priority in the time slots #2–#4 in the link L2'.

Next, the node N8' produces and transmits a path setup message shown in FIG. 10 to the node N4' via a link L2', wherein the path setup message contains the number of the paths and hence the number of the time slots to be switched at the node N4' and the identification of the unused time slot included in the link L2' and having the highest order of priority. As each time slot carries the same amount of information, the information for designating the capacity of time slot is not necessary in the path setup message used in the second embodiment. In the illustrated example, the time slot #2 has the highest priority among the time slots #2–#4. Similarly to the first embodiment, each node of FIG. 10 includes a database for storing the order of priority, and the node N4' recovers the slots #2–#4 from the path setup message thus transmitted and effects a modification of the switching table therein as represented in FIG. 11(C). There, it will be noted that the time slots #10–#12 are the unused time slots in the link L3' wherein the time slot #10 has the highest order of priority, the time slot #12 has the lowest order of priority.

Figure 11D:
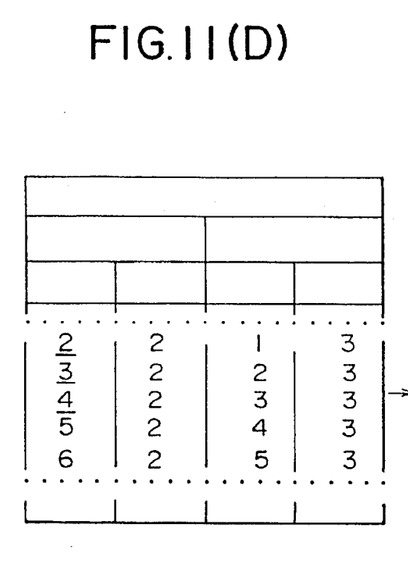
Figure 11E:
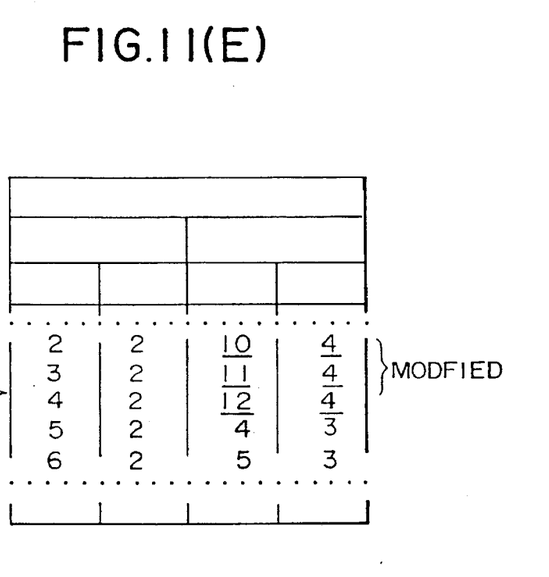

Further, the node N4' transmits the path setup message to the node N2' after modifying the time slot having the highest priority from #2 to #10 as indicated, while keeping the number of the time slots unchanged. At the node N2, the time slots #10–#12 are recovered by referring to a database provided thereto and the switching to the time slots in the link L4' is achieved according to the order of priority, as indicated in FIGS. 11(D) and 11(E), wherein FIG. 11(D) shows the switching table at the node N4' before the modification and FIG. 11(E) shows the switching table after the modification. Thereby, the alternative communication path is successfully restored between the node N2' and the node N8'.

Further the present invention is not limited to the embodiments described heretofore, but various variations and modifications may be made without departing from the scope of the invention.

What is claimed is:

1. A method for restoring communication in case a communication failure has occurred in an original communication route set in a distributed control network which includes a plurality of nodes connected with each other by links, each link including a plurality of paths, the method comprising the steps of:

searching for an alternative communication route along which the communication can be restored such that said alternative communication route will extend from a first end node of said plurality of nodes to a second node via an intermediate node;

providing a predetermined order for selection of paths in each link;

connecting, at said first end node, after said step of searching for said alternative communication route has been completed, paths in a first link extending from said first end node and forming a part of the original communication route, and paths in a second link extending from said first end node and forming a part of said alternative communication route, said paths in said second link being determined based upon said predetermined order for selection;

transmitting from said first end node a first path setup message which contains information about the number of paths in said second link, used for said alternative communication route, and an identification of a reference path which is included in said second link, used for said alternative communication route, said first path setup message being transmitted along said second link, said reference path being a first path in said second link that is selected for said alternative communication route;

identifying, in said intermediate node included in said alternative communication route and to which a second path setup message is transmitted via a third link that forms a part of said alternative communication route, the paths in said third link to be switched at said intermediate node for setting up said alternative communication route, based upon said second path setup message transmitted thereto, said second path setup message containing information about the number of the paths in said third link, to be used at said intermediate node for establishing said alternative communication route, and an identification of a reference path that is first selected in said third link for establishing said alternative communication route in accordance with said predetermined order for selection;

effecting switching at said intermediate node, for connecting the paths in said third link, identified based upon said second path setup message, to paths in a fourth link that extends from said intermediate node and forms a part of said alternative communication route according to said second path setup message, starting from said reference path identified in said second path setup message, said intermediate node further transmitting a modified path setup message via said fourth link such that said modified path setup message contains an identification of a reference path that is first selected in said fourth link for said alternative communication route, in addition to the information about the number of the paths for establishing the alternative communication route;

identifying, at said second end node to which a third path setup message is transmitted via a fifth link that forms a part of said alternative communication route, the paths in said fifth link to be switched at said second end node for setting up said alternative communication route, based upon said third path setup message transmitted thereto, said third path setup message containing information about a predetermined transmission capacity required for the alternative communication route, the number of paths in said fifth link to be used at said second end node for establishing said alternative communication route, and an identification of a reference virtual path in said fourth link which is first selected for establishing said alternative communication route in accordance with said predetermined order for selection; and effecting switching, at said second end node for connecting the paths in said fifth link, identified based on said third path setup message, to paths in a sixth link that extends from said second end node and forms a part of the original communication route, according to said third path setup message starting from said reference virtual path, to thereby establish connections between all parts forming said alternative communication route to restore communication.

2. The method as claimed in claim 1, in which said step of providing a predetermined priority order is applied to each path included in each link.

3. The method as claimed in claim 1, in which each of said links carries an information signal including time slots provided in a transmission frame thereof for carrying information in a synchronous transfer mode.

4. The method as claimed in claim 1, in which said paths in each of said links are virtual paths, having respective transmission capacities.

5. The method as claimed in claim 4, in which each of said first and second path setup messages further contains information about a total transmission capacity required for said alternative communication route.

6. The method as claimed in claim 5, in which said step of selecting the paths in each of said first and second nodes is conducted according to in order of said transmission capacity of the virtual paths, when a plurality of virtual paths having the same order of priority are selected.

7. The method as claimed in claim 6, in which said step of selecting the paths in each of said first and second nodes is conducted according to the order of said transmission capacity for identifying the virtual paths.

8. A method for restoring communication when a communication failure has occurred in an original communication route set in a distributed control network which includes a plurality of nodes connected with each other by links, each link including a plurality of paths, the method comprising the steps of:

searching for an alternative communication route extending from a first end node to a second end node via an intermediate node in order to restore communication along said alternative communication route;

providing a predetermined priority order for selection of paths in each link;

determining a predetermined transmission capacity required for said alternative communication route;

connecting, at said first end node, after said step of searching for said alternative communication route has been completed, the paths in a first link extending from said first end node and forming a part of the original communication route, and the paths in a second link extending from said first end node and forming a part of said alternative communication route, said paths in said second link being determined based on said predetermined priority order such that said predetermined transmission capacity required for said alternative communication route is satisfied;

transmitting from said first end node a first path setup message that contains information about the predetermined transmission capacity required for the alternative communication route, the number of the paths in said second link, used for said alternative communication route, and an identification of a reference path in said second link, used for said alternative communication route, said first path setup message being transmitted along said second link, said reference path being a first path in said second link that is selected for said alternative communication route in accordance with said predetermined priority order;

identifying, at the intermediate node included in said alternative communication route and to which a second path setup message is transmitted via a third link that forms a part of said alternative communication route, the paths in said third link to be switched at said intermediate node for setting up said alternative communication route, based upon said second path setup message transmitted thereto, said second path setup message containing information about the predetermined transmission capacity required for the alternative communication route, the number of the paths in said third link, to be used at said intermediate node for establishing said alternative communication route, and an identification of a reference path that is first selected in said third link for establishing said alternative communication route in accordance with said predetermined priority order;

effecting switching at said intermediate node, for connecting the paths in said third link, identified based upon said second path setup message, to paths in a fourth link that extends from said intermediate node and forms a part of said alternative communication route according to said second path setup message, starting from said reference path identified by said second path setup message, said intermediate node further transmitting a modified path setup message via said fourth link such that said modified path setup message contains an identification of a reference path that is first selected in said fourth link for said alternative communication route in accordance with said predetermined priority order, in addition to the information about the predetermined transmission capacity required for said alternative communication route and the number of the paths used for the alternative communication route;

identifying, at said second end node to which a third path setup message is transmitted via a fifth link that forms a part of said alternative communication route, the paths in said fifth link to be switched at said second end node for setting up said alternative communication route, based upon said third path setup message transmitted thereto, said third path setup message containing information about the predetermined transmission capacity required for the alternative communication route, the number of the paths in said fifth link to be used at said second end node for establishing said alternative communication route, and an identification of a reference virtual path in said fourth link which is first selected for establishing said alternative communication route in accordance with said predetermined priority order; and effecting switching, at said second end node, for connecting the paths in said fifth link, identified based upon said third path setup message, to paths in a sixth link that extends from said second end node and forms a part of the original communication route according to said third path setup message, starting from said reference virtual path identified in said third path setup message such that the predetermined transmission capacity required for the alternative communication route is satisfied to thereby establish connections between all parts forming said alternative communication route to restore communication.

* * * * *